US009036758B2

(12) United States Patent
Yoon et al.

(10) Patent No.: US 9,036,758 B2
(45) Date of Patent: May 19, 2015

(54) METHOD AND APPARATUS FOR DETECTING ENVELOPE

(75) Inventors: Seung Keun Yoon, Seoul (KR); Ui Kun Kwon, Hwaseong-si (KR); Sang Joon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 310 days.

(21) Appl. No.: 13/595,311

(22) Filed: Aug. 27, 2012

(65) Prior Publication Data

US 2013/0142235 A1 Jun. 6, 2013

(30) Foreign Application Priority Data

Dec. 2, 2011 (KR) ........................ 10-2011-0128451

(51) Int. Cl.
*H04L 7/00* (2006.01)
*G10L 25/00* (2013.01)

(52) U.S. Cl.
CPC ...................................... *G10L 25/00* (2013.01)

(58) Field of Classification Search
CPC ...... H04W 56/00; G01S 7/292; H03F 1/0222; H03F 1/0227; H03F 1/0266
USPC ......... 375/140–153, 224–228, 259–260, 285, 375/316–352
See application file for complete search history.

(56) References Cited

U.S. PATENT DOCUMENTS

| | | | | |
|---|---|---|---|---|
| 3,577,081 | A * | 5/1971 | Schulz | 455/202 |
| 4,423,519 | A * | 12/1983 | Bennett et al. | 375/324 |
| 7,257,384 | B2 | 8/2007 | Bar-David et al. | |
| 7,738,605 | B2 | 6/2010 | Mobin et al. | |
| 2004/0091026 | A1 * | 5/2004 | Nakayama | 375/148 |
| 2004/0139466 | A1 * | 7/2004 | Sharma et al. | 725/72 |
| 2009/0225918 | A1 * | 9/2009 | Telukuntla et al. | 375/360 |
| 2010/0271119 | A1 | 10/2010 | Karoui et al. | |
| 2011/0077907 | A1 | 3/2011 | Szajnowski | |

FOREIGN PATENT DOCUMENTS

| | | | |
|---|---|---|---|
| JP | 2681956 | B2 | 8/1997 |
| KR | 10-2002-0081011 | A | 10/2002 |
| KR | 10-2008-0057373 | A | 6/2008 |
| WO | WO 2004/021363 | A1 | 3/2004 |

OTHER PUBLICATIONS

European Search Report issued May 7, 2013 in counterpart European Patent Application No. 12190321.5-1910.
Carlos Fritsch et al. "A Digital Envelope Detection Filter for Real-Time Operation." Instrumention and Measurement, IEEE Transactions on 48.6 (Dec. 1999): pp. 1287-1293.

(Continued)

*Primary Examiner* — Sam K. Ahn
*Assistant Examiner* — James M Perez
(74) *Attorney, Agent, or Firm* — NSIP Law

(57) ABSTRACT

A method and apparatus for detecting an envelope are provided. The method and apparatus may detect an envelope of a modulating signal based on a low calculation complexity and a simple circuit configuration, by detecting an envelope for a plurality of sampling signals with equal time intervals.

18 Claims, 11 Drawing Sheets

(56) References Cited

OTHER PUBLICATIONS

Zhengguang Xu et al. "An alternative envelope approach for empirical mode decomposition." Digital Signal Processing 20.1 (Jan. 2010): pp. 77-84.

Ui Kun Kwon et al. "Synchronization Algorithm of Resonator Isolation System for Efficient Power and Data Transmission." Global Communications Conference (GLOBECOM) (Dec. 2012) IEEE pp. 3970-3975.

* cited by examiner

800

METHOD AND APPARATUS FOR DETECTING ENVELOPE

CROSS-REFERENCE TO RELATED APPLICATION(S)

This application claims the benefit under 35 USC §119(a) of Korean Patent Application No. 10-2011-0128451, filed on Dec. 2, 2011, in the Korean Intellectual Property Office, the entire disclosure of which is incorporated herein by reference for all purposed.

BACKGROUND

1. Field

The following description relates to a method and apparatus for detecting an envelope.

2. Description of Related Art

Envelope detection is used to process signals in various fields, for example, in a speech processing field, an image processing field, a data communication field, and the like, in which a modulating signal is received and demodulated. As another example, the envelope detection may be used in a field such as energy or data transmission.

In a typical envelope detection method, signal processing is performed. For example, the signal processing may include filtering using a band-pass filter or a low-pass filter in a frequency band, a scheme of using a peak hold in an analytic signal obtained by the Hilbert transform, and the like. However, signal processing may require a considerable amount of circuit complexity for implementation. In lower complexity schemes that include an analog circuit such as a diode, a capacitor, and the like, the circuit complexity is reduced. However, these low complexity schemes struggle to detect a sophisticated envelope.

SUMMARY

In one aspect, there is provided a method of detecting an envelope, the method including extracting sampling signals from among a plurality of sampling signals corresponding to a modulating signal, distinguishing a target sampling signal from among the extracted sampling signals, calculating envelope component values of the target sampling signal, based on a difference between a component associated with the target sampling signal and components associated with the other sampling signals from among the extracted sampling signals, and detecting an envelope of the modulating signal based on the calculated envelope component values.

The calculating may comprise performing multiplication between the target sampling signal and each of the other extracted sampling signals, to individually calculate the component associated with the target sampling signal and the components associated with the other extracted sampling signals, and performing addition on values obtained by multiplying the other extracted sampling signals.

The method may further comprise calculating an average value of the envelope component values corresponding to the target sampling signal.

'2N+1' sampling signals may be extracted from among the plurality of sampling signals, where N is a natural number that is equal to or greater than '1.'

The extracted sampling signals may comprise a first sampling signal, a second sampling signal, and a third sampling signal, and a first time interval between the first sampling signal and the second sampling signal may be equal to a second time interval between the second sampling signal and the third sampling signal.

The method may further comprise adjusting a first time interval between a first sampling signal and a second sampling signal, and adjusting a second time interval between the second sampling signal and a third sampling signal.

The method may further comprise generating the plurality of sampling signals corresponding to the modulating signal.

The extracted sampling signals may be sampled at equal time intervals.

The plurality of sampling signals may correspond to a modulating signal that is obtained through an analog-to-digital conversion (ADC).

The calculating may be repeatedly performed a plurality of times until an overall envelope of the modulating signal is obtained.

The extracting may comprise extracting at least three sampling signals from among the plurality of sampling signals corresponding to the modulating signal In an aspect, there is provided a non-transitory computer readable recording medium storing a program to cause a computer to implement the method.

In an aspect, there is provided an apparatus for detecting an envelope, the apparatus including an extracting unit configured to extract sampling signals from among a plurality of sampling signals corresponding to a modulating signal, a distinguishing unit configured to distinguish a target sampling signal from among the extracted sampling signals, a calculating unit configured to calculate envelope component values corresponding to the target sampling signal, based on a difference between a component associated with the target sampling signal and components associated with the other sampling signals from among the extracted sampling signals, and a detecting unit configured to detect an envelope of the modulating signal based on the calculated envelope component values.

The calculating unit may comprise a multiplier configured to perform multiplication between the target sampling signal and each of the other extracted sampling signals, to individually calculate the component associated with the target sampling signal and the components associated with the other extracted sampling signals, and an adder configured to perform addition on values obtained by multiplying the other extracted sampling signals.

The apparatus may further comprise an average operator configured to calculate an average value of the envelope component values corresponding to the target sampling signal.

'2N+1' sampling signals may be extracted from the plurality of sampling signals, where N is a natural number that is equal to or greater than 1.

The extracted sampling signals may comprise a first sampling signal, a second sampling signal, and a third sampling signal, and a first time interval between the first sampling signal and the second sampling signal may be equal to a second time interval between the second sampling signal and the third sampling signal.

The apparatus may further comprise an adjusting unit configured to adjust a first time interval between a first sampling signal and a second sampling signal, and to adjust a second time interval between the second sampling signal and a third sampling signal.

The apparatus may further comprise a generating unit configured to generate the plurality of sampling signals corresponding to the modulating signal.

The extracted sampling signals may be sampled at equal time intervals.

Other features and aspects will be apparent from the following detailed description, the drawings, and the claims.

Figure 1:
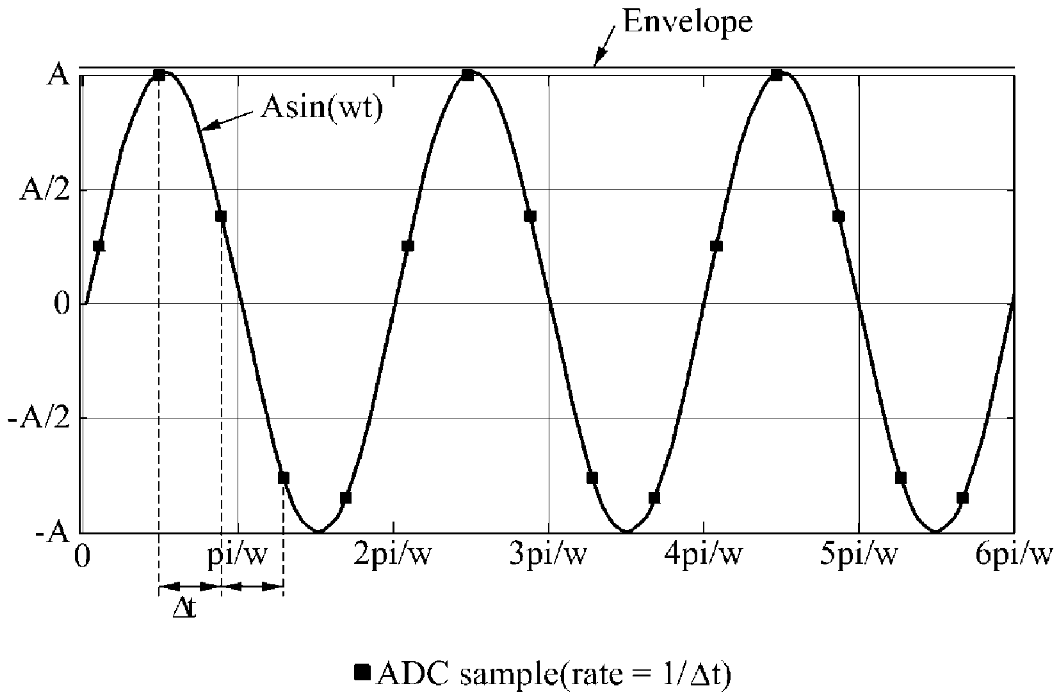
FIG. 1 is a graph illustrating an example of an envelope detected from a sine wave.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

As one example, the envelope detection technology herein may be used to exchange control information or other information between devices such as a transmitter and a receiver in a wireless power transmission system. In this example, the wireless power transmission system may be used to wirelessly charge a target device with power.

It should also be appreciated that the examples herein are not limited thereto. For example, the envelope detection technology may be used in various fields, for example, in a speech processing field, an image processing field, a data communication field, and the like, in which a modulating signal is received and demodulated.

FIG. 1 illustrates an example of an envelope detected from a sine wave.

The example of FIG. 1 illustrates a sine wave-shaped signal waveform. An envelope may be obtained by connecting peak values of a waveform of a modulated carrier wave signal, and may be referred to as an 'envelope curve.'

A continuous sine wave x(t) is represented by the following Equation 1:

$$x(t)=A\sin(2\pi f_c t+\theta) \quad \text{[Equation 1]}$$

In Equation 1, A denotes an amplitude of a sine wave and has a predetermined constant value, and $f_c$ denotes a carrier frequency. Additionally, θ denotes a phase value between '0' and '2π.' Furthermore, x(t) denotes sampling signals corresponding to a modulating signal that is obtained by an Analog-to-Digital Convertor (ADC), and may be expressed as $x(t_1)$, $x(t_2)$, $x(t_3)$, . . . , and $x(t_m)$. The sampling signals may be referred to as ADC samples.

An interval between two sampling signals may be defined as Δt. For example, if signals are sampled at equal intervals $f_s$ of 1/Δt, three consecutive sampling signals with equal intervals may be expressed as x(T−τ), x(T), and x(T+τ). In this example, a value of τ may be a constant multiple of Δt.

Additionally, the three consecutive sampling signals may be represented as shown in the following Equation 2:

$$[x(T-\tau), x(T), x(T+\tau)]=[A\sin(\alpha-\epsilon), A\sin(\alpha), A\sin(\alpha+\epsilon)] \quad \text{[Equation 2]}$$

In Equation 2, $\alpha=2\pi f_c T+\theta$, $\epsilon=2\pi f_c\tau$, and $\tau=c\Delta t$ where c is an integer.

Figure 2:
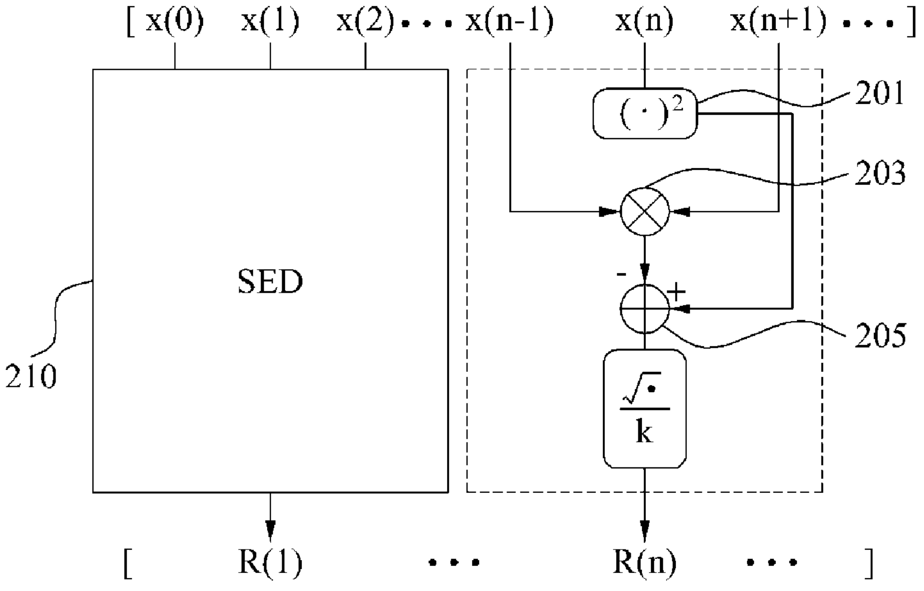
FIG. 2 is a diagram illustrating an example of detecting an envelope.

The three consecutive sampling signals may be input to a Sequential Envelope Detection (SED) 210 apparatus of FIG. 2, and may be computed using the following Equation 3:

$$\begin{aligned}(kR(T))^2 &= x(T)^2 - x(T-\tau)\cdot x(T+\tau) \quad \text{[Equation 3]}\\ &= A^2(\sin^2\alpha - \sin(\alpha-\varepsilon)\cdot\sin(\alpha+\varepsilon))\\ &= A^2\left(\sin^2\alpha + \frac{1}{2}(\cos 2\alpha - \cos 2\varepsilon)\right)\\ &= A^2(\sin^2\alpha + \frac{1}{2}((1-2\sin^2\alpha - 1 + 2\sin^2\varepsilon))\\ &= A^2\sin^2\varepsilon\end{aligned}$$

In Equation 3, ϵ is equal to '$2\pi f_c\tau$.' Accordingly, $\sin^2\epsilon$ may be equal to '$\sin^2(2\pi f_c\Delta t)$,' namely, a constant that is already known. For example, if k is set to sin ϵ, and if a square root operation is performed on a square of an envelope component such as A, a value of A may be extracted as shown in Equation 4:

$$R(T) = \frac{1}{k}\sqrt{A^2\sin^2\varepsilon} = A \quad \text{[Equation 4]}$$

When ϵ in Equation 4 is not equal to 'nπ,' an accurate value of A may be extracted. In addition, if sin ϵ is close to 1 even though an accurate value of a scaling factor k set to sin ϵ is not known, an envelope may be restored robustly against the scaling factor k.

An example in which sin ϵ is close to 1 may satisfy $$wc\Delta t \approx \left(\frac{1}{2}+n\right)\pi.$$

FIG. 2 illustrates an example of detecting an envelope.

Referring to FIG. 2, SED 210 refers to an apparatus for sequentially detecting an envelope. For example, the SED

210 may calculate a single envelope component value using a plurality of sampling signals corresponding to a modulating signal. As an example, '2N+1' sampling signals may be sampled at equal intervals, where N is a natural number that is equal to or greater than '1.'

The sine wave x(t) may correspond to a modulating signal from which an envelope is to be detected, as shown in FIG. 1, and may be represented using an envelope component R(n) and a carrier component '$\sin(2\pi f_c T+\theta)$.'

Referring to FIG. 2, sampling signals are expressed as x(0), x(1), x(2), x(n−1), x(n), x(n+1), and the like. The SED 210 may sample the '2N+1' sampling signals from the modulating signal. In this example, the SED 210 may perform squaring 201 on a sampling signal x(n), multiplication 203 on sampling signals x(n−1) and x(n+1), and addition 205 on two values obtained by the squaring 201 and the multiplication 203.

Through the above-described example process, the SED 210 may calculate a single envelope component value. This process may be repeated until an overall envelope of the modulating signal is obtained.

The SED 210 may sample '2N+1' sampling signals from the modulating signal, and Equation 3 may be generalized to be the following Equation 5:

$$(k_N R(T))^2 = Nx(T)^2 - \sum_{j=1}^{N} x(T-\tau_j)\cdot x(T+\tau_j) \quad \text{[Equation 5]}$$

In Equation 5, a constant $k_N$ has a value of $$(k_N)^2 = \sum_{j=1}^{N} \sin^2 \varepsilon_j,$$

$\epsilon_j$ has a value of $\epsilon_j = 2\pi f_c \tau_j$, and $\tau_j$ has a value of $\tau_j = c_j \Delta t$ ($c_i \neq c_j$, if $i \neq j$). In this example, an interval between values of $\tau_j$ does not need to be equal.

Figure 3:
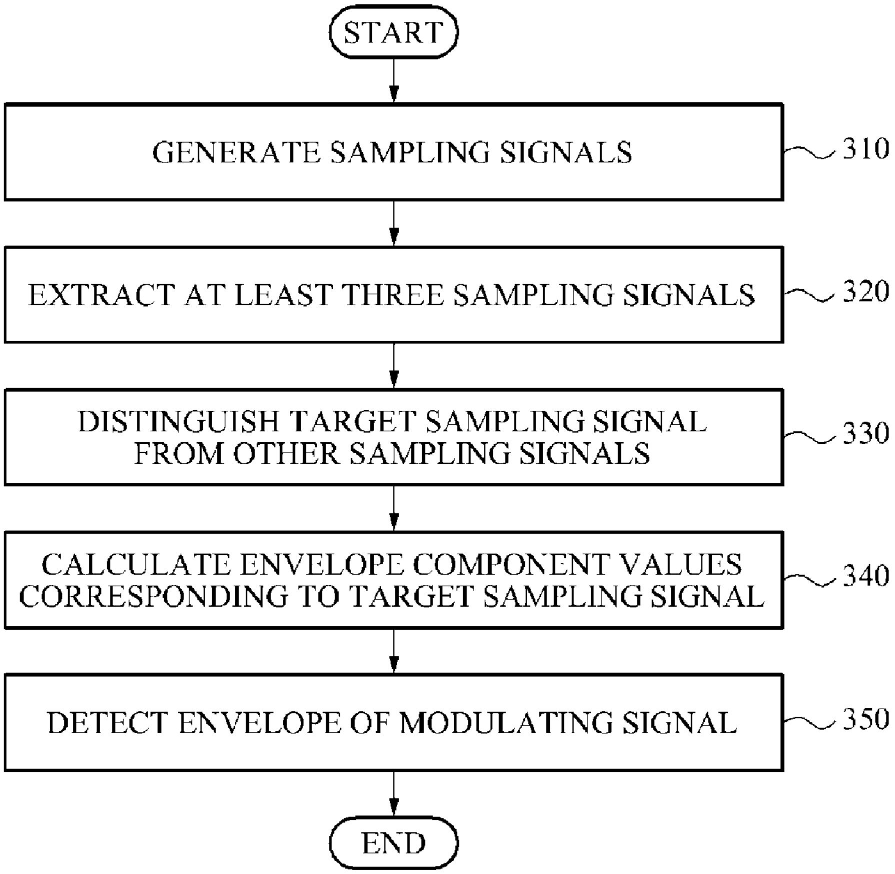
FIG. 3 is a flowchart illustrating an example of a method for detecting an envelope.

FIG. 3 illustrates an example of a method for detecting an envelope.

Referring to FIG. 3, in 310, an apparatus for detecting an envelope (hereinafter, referred to as an 'envelope detection apparatus') generates a plurality of sampling signals. The sampling signals may correspond to a modulating signal. The sampling signals do not necessarily need to be consecutively provided. Additionally, in an example in which intervals between sampling signals are equal, sampling signals corresponding to one of two modulating signals, or one of three modulating signals may be generated.

In 320, the envelope detection apparatus extracts at least three sampling signals from among the generated sampling signals. The extracted sampling signals may be sampled at equal time intervals. For example, '2N+1' sampling signals may be extracted, where N is a natural number that is equal to or greater than '1.' For example, the number of sampling signals extracted may be an odd number equal to or greater than '3', for example 3, 5, 7, and the like.

In the example of 320, the at least three sampling signals may include a first sampling signal, a second sampling signal, and a third sampling signal. A first time interval between the first sampling signal and the second sampling signal may be equal to a second time interval between the second sampling signal and the third sampling signal. For example, the first time interval may be set to Δt and the second time interval may also be set to Δt. In another example, the first time interval may be set to 2Δt and the second time interval may also be set to 2Δt.

In 330, the envelope detection apparatus distinguishes a single target sampling signal from among the extracted sampling signals. The target sampling signal may be expressed as, for example x(n), and the other sampling signals may expressed as, for example x(n−1) and x(n+1), or x(n−2), x(n−1), x(n+1) and x(n+2).

In 340, the envelope detection apparatus calculates envelope component values corresponding to the target sampling signal, based on a difference between a component associated with the target sampling signal and components associated with the other sampling signals, as shown in Equation 3 or 5. An example of 340 is described with reference to FIG. 4.

In 350, the envelope detection apparatus detects an envelope of the modulating signal based on the calculated envelope component values.

Figure 4:
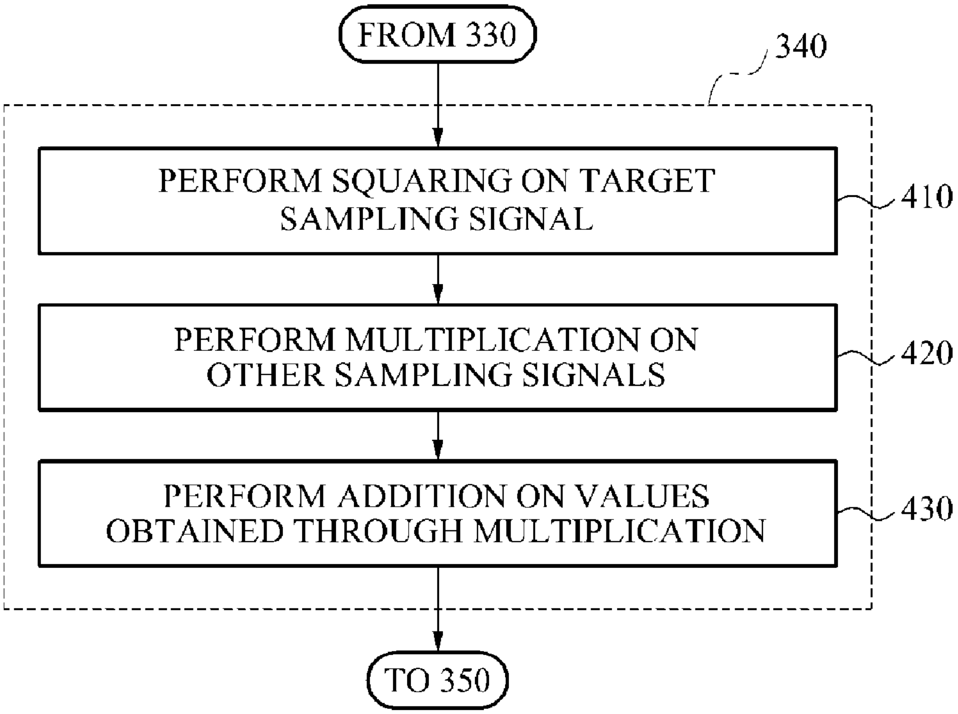
FIG. 4 is a flowchart illustrating an example of calculating envelope component values in the method of FIG. 3

FIG. 4 illustrates an example of operation 340 of FIG. 3.

Referring to FIG. 4, in 410, the envelope detection apparatus performs squaring on the target sampling signal, to calculate a component that is associated with the target sampling signal. In 420, the envelope detection apparatus performs multiplication on the other sampling signals to calculate components that are associated with the other sampling signals. For example, the envelope detection apparatus may perform squaring on the target sampling signal x(T), to calculate a component $x(T)^2$ associated with the target sampling signal x(T), and may perform multiplication on sampling signals x(T−τ) and x(T+τ) to calculate a component 'x(T−τ)*x(T+τ).'

In 430, the envelope detection apparatus performs addition on values obtained through multiplication of the other sampling signals. For example, five sampling signals may be sampled. The envelope detection apparatus may perform addition on four of the values 'x(T−τ)*x(T+τ),' 'x(T−2τ)*x(T+2τ),' and the like, that are obtained through multiplication of sampling signals x(T−2τ), x(T−τ), x(T+τ), and x(T+2τ) excluding the target sampling signal x(T).

Figure 5:
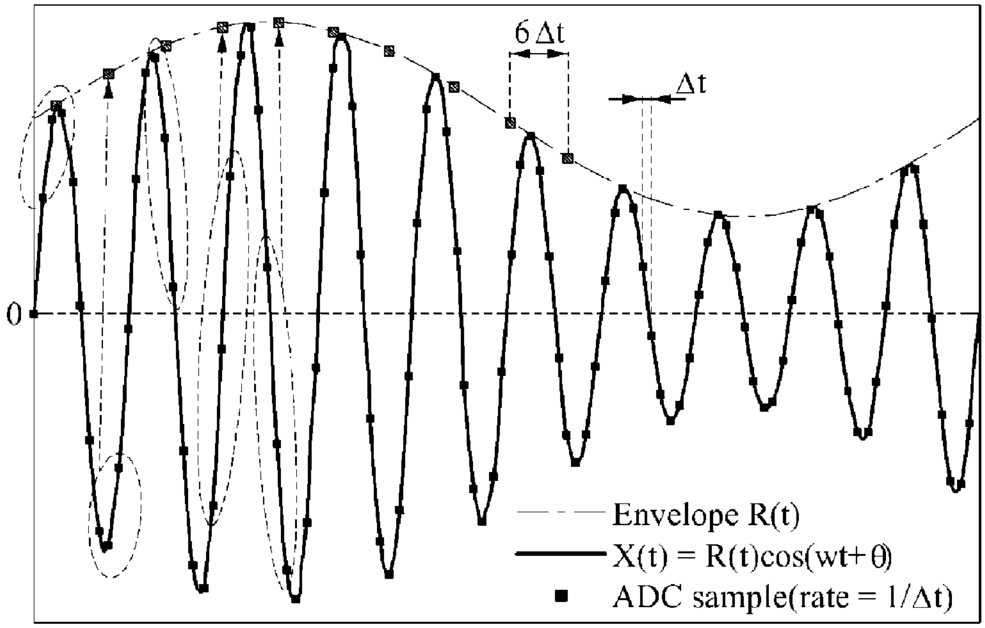
FIG. 5 is a graph illustrating an example of an envelope detected from sampling signals with a Sequential Envelope Detection (SED) gap of Δt and a SED rate of ⅙Δt.

FIG. 5 illustrates an example of an envelope detected from sampling signals with a SED gap of Δt and a SED rate of 1/6Δt.

Referring to FIG. 5, two parameters are defined. A SED gap refers to a time interval between consecutive sampling signals x(t) and is used to extract a single envelope component value R(n). Additionally, a SED rate is the inverse of a sampling period of the sampling signals.

Figure 6:
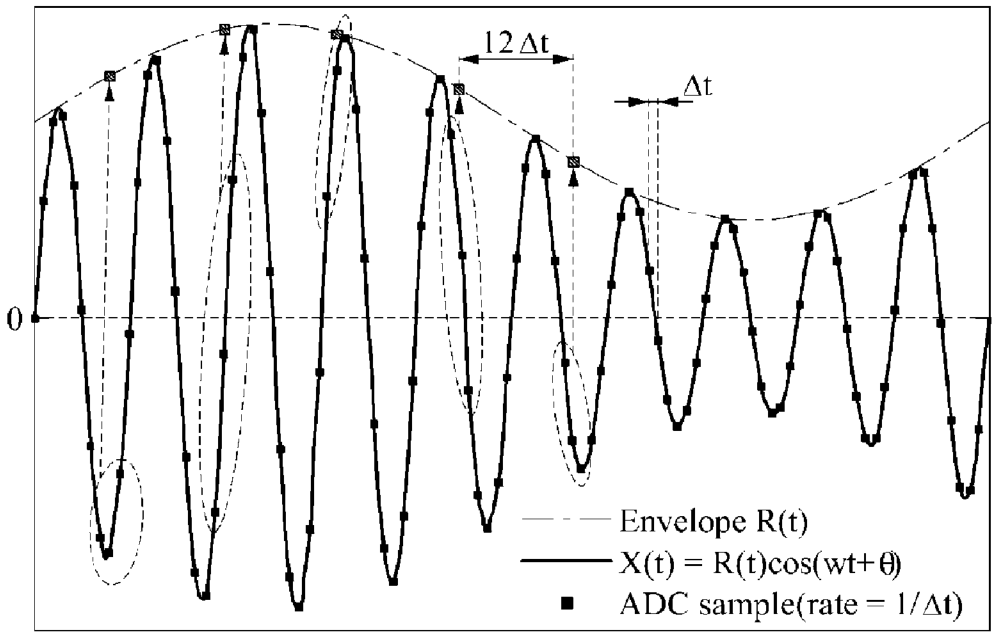
FIG. 6 is a graph illustrating an example of an envelope detected from sampling signals with a SED gap of Δt and a SED rate of 1/12Δt.
Figure 7:
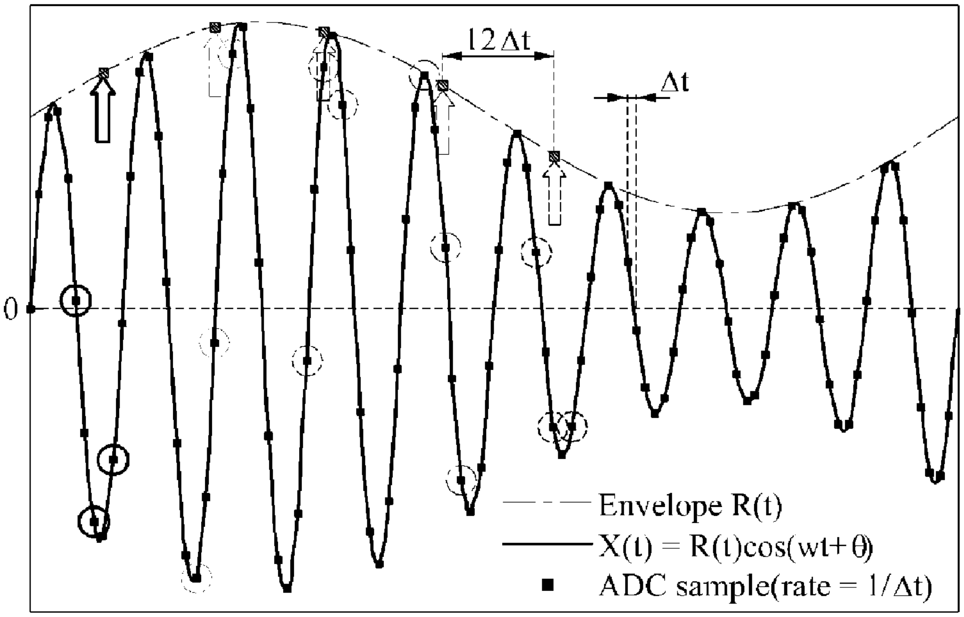
FIG. 7 is a graph illustrating an example of an envelope detected from sampling signals with a SED gap of 2Δt and a SED rate of 1/12Δt.

FIG. 6 illustrates an example of an envelope detected from sampling signals with a SED gap of Δt and a SED rate of 1/12Δt, and FIG. 7 illustrates an example of an envelope detected from sampling signals with a SED gap of 2Δt and a SED rate of 1/12Δt.

Figure 8:
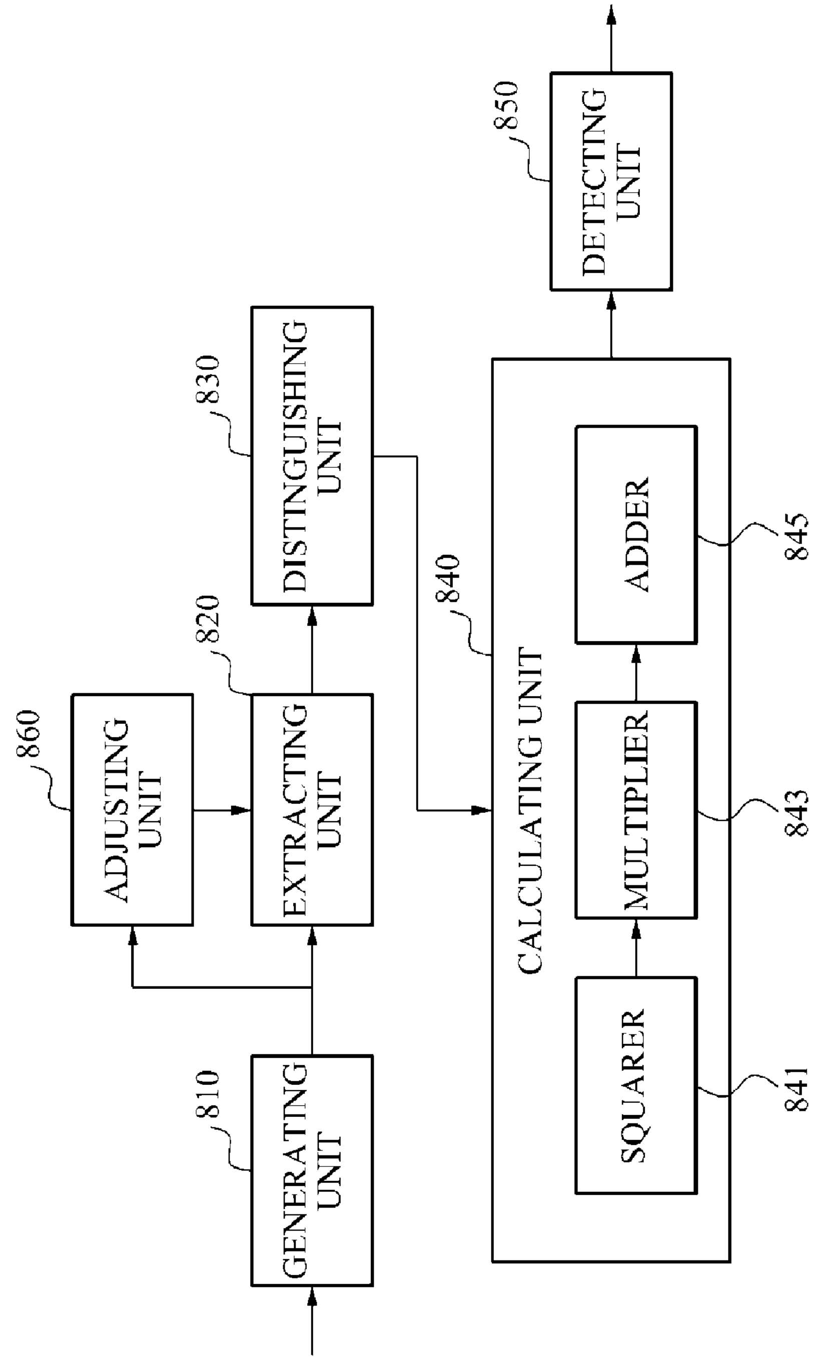
FIG. 8 is a diagram illustrating an example of an envelope detection apparatus.

FIG. 8 illustrates an example of an envelope detection apparatus.

Referring to FIG. 8, envelope detection apparatus 800 includes a generating unit 810, an extracting unit 820, a distinguishing unit 830, a calculating unit 840, and a detecting unit 850. The envelope detection apparatus 800 may further include an adjusting unit 860.

The generating unit 810 may generate a plurality of sampling signals corresponding to a modulating signal.

The extracting unit 820 may extract at least three sampling signals from among the plurality of sampling signals. For example, the extracted sampling signals may be sampled at equal time intervals. As an example, '2N+1' sampling signals may be extracted where N is a natural number that is equal to or greater than '1.' For example, a number of extracted sampling signals may be an odd number equal to or greater than '3', for example 3, 5, 7, and the like.

The at least three sampling signals may include at least a first sampling signal, a second sampling signal, and a third sampling signal. In this example, a first time interval between the first sampling signal and the second sampling signal may be equal to a second time interval between the second sampling signal and the third sampling signal.

For example, if the at least three sampling signals include a first sampling signal, a second sampling signal, a third sampling signal, a fourth sampling signal, and a fifth sampling signal, a first time interval between the first sampling signal and the second sampling signal, a second time interval between the second sampling signal and the third sampling signal, a third time interval between the third sampling signal and the fourth sampling signal, and a fourth time interval between the fourth sampling signal and the fifth sampling signal may be equal to each other.

The sampling signals may not be consecutively provided. Additionally, if intervals between sampling signals are equal, sampling signals corresponding to one of two modulating signals, or one of three modulating signals may be generated.

The distinguishing unit 830 may distinguish a single target sampling signal from among the extracted sampling signals.

The calculating unit 840 may calculate envelope component values corresponding to the target sampling signal. For example, the calculating unit may calculate envelope components based on a difference between a component associated with the target sampling signal and components associated with the other sampling signals. In the example of FIG. 8, the calculating unit 840 includes a squarer 841, a multiplier 843, and an adder 845.

The squarer 841 may perform squaring on the target sampling signal, to calculate a component associated with the target sampling signal. The multiplier 843 may perform multiplication on the other sampling signals except for the target sampling signal to calculate components associated with the other sampling signals. Additionally, the addition operator 845 may perform addition for Σ operation on values obtained by multiplying the other sampling signals. The squarer 841, the multiplier 843, and the adder 845 included in the calculating unit 840 may perform calculation using the above-described Equation 3 or 5.

The detecting unit 850 may detect an envelope of the modulating signal based on the envelope component values.

The adjusting unit 860 may adjust time intervals between sampling signals. For example, the adjusting unit 860 may adjust a value of a first time interval between the first sampling signal and the second sampling signal, and may adjust a value of a second time interval between the second sampling signal and the third sampling signal, and the like.

Figure 9:
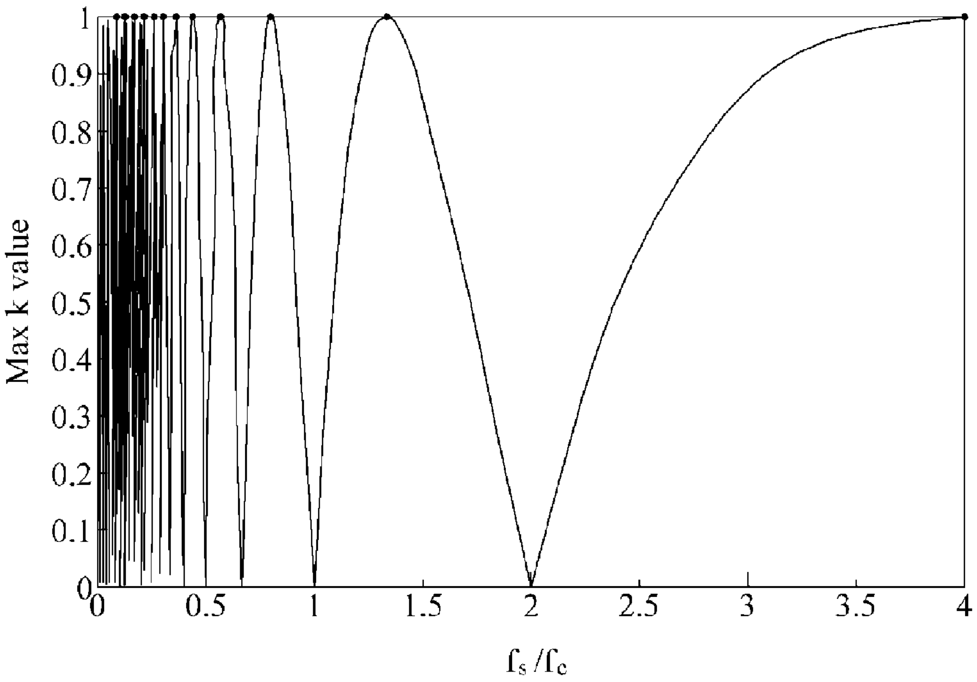
FIG. 9 is a graph illustrating an example of a change in a maximum value of k using a function of a sampling rate $f_s/f_c$ for a carrier frequency.

FIG. 9 illustrates an example of a change in a maximum value of k using a function of a sampling rate $f_s/f_c$ for a carrier frequency. In this example, an envelope is detected using three consecutive sampling signals with a SEP gap of Δt among a plurality of sampling signals.

In a graph of FIG. 9, dots correspond to k with a value of '1,' and are identical to dots in which an interval between sampling signals corresponds to $$\Delta t = \left(\frac{1}{2} + n\right)\frac{\pi}{w}$$

in a square sum root scheme when a SED gap is Δt. As illustrated in FIG. 9, an envelope may be detected even though an interval between neighboring sampling signals does not correspond to $$\Delta t = \left(\frac{1}{2} + n\right)\frac{\pi}{w}$$

(except for an example in which the sampling rate $f_s/f_c$ is equal to '1/n' where n is 0.5 or an integer).

Figure 10:
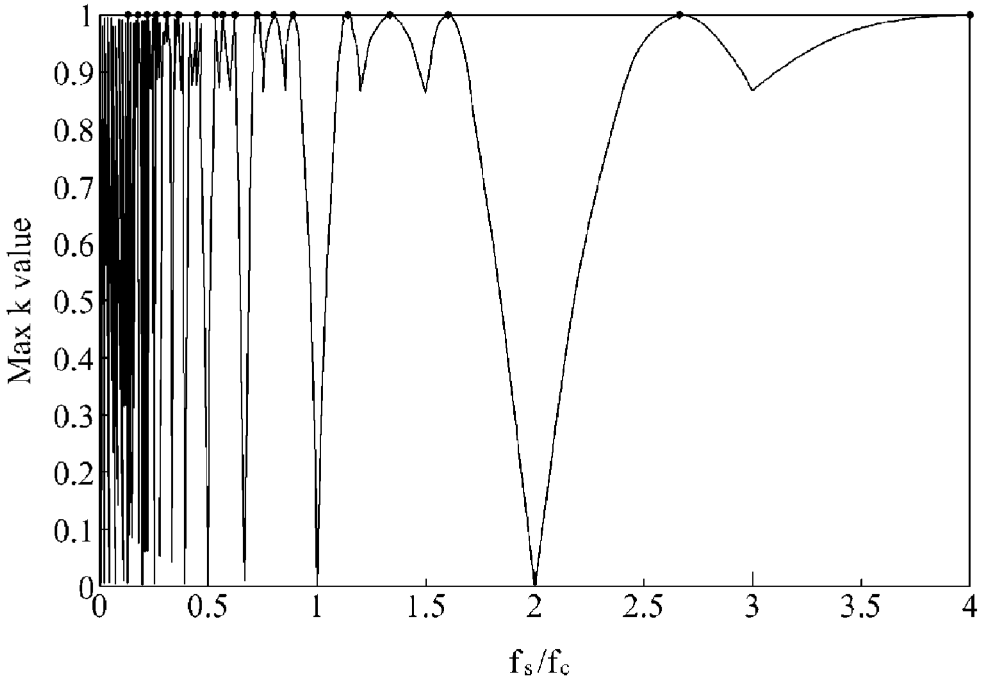
FIG. 10 is a graph illustrating another example of a change in a maximum value of k using a function of a sampling rate $f_s/f_c$ for a carrier frequency.

FIG. 10 illustrates another example of a change in a maximum value of k using a function of a sampling rate $f_s/f_c$ for a carrier frequency. In this example, three consecutive sampling signals with a SEP gap of Δt are compared with three consecutive sampling signals with a SEP gap of 2Δt, among a plurality of sampling signals.

Referring to FIG. 10, an envelope may be detected regardless of a value of the sampling rate $f_s/f_c$, except for an example in which the sampling rate $f_s/f_c$ is equal to '1/n' where n may be 0.5, 1, 2, and the like. In this example, as the sampling rate $f_s/f_c$ satisfying 'k=1' increases, a more sophisticated envelope may be detected.

Figure 11:
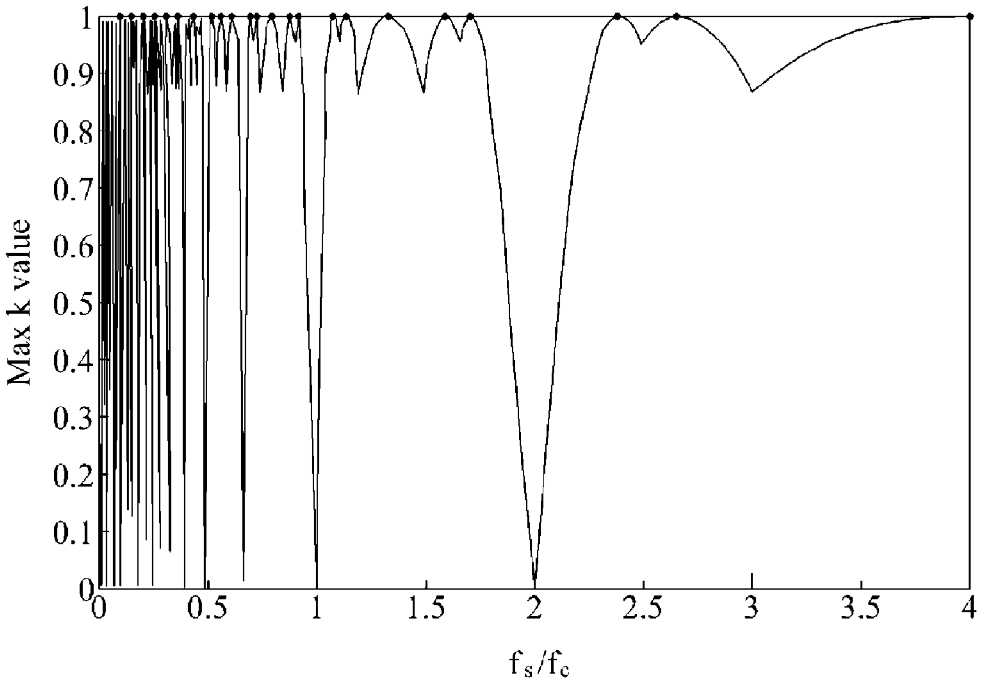
FIG. 11 is a graph illustrating another example of a change in a maximum value of k using a function of a sampling rate $f_s/f_c$ for a carrier frequency.

FIG. 11 illustrates another example of a change in a maximum value of k using a function of a sampling rate $f_s/f_c$ for a carrier frequency. In this example, three consecutive sampling signals with a SEP gap of Δt are compared with three consecutive sampling signals with a SEP gap of 2Δt, and with three consecutive sampling signals with a SEP gap of 3Δt, among a plurality of sampling signals.

A graph of FIG. 11 is similar to a graph of FIG. 10. If the SED gap is increased from Δt to 3Δt, the sampling rate $f_s/f_c$ satisfying 'k=1' may be increased. Accordingly, a range for detecting a more sophisticated envelope may be widened.

The above-described examples of detecting an envelope may be implemented using various ways based on a SED gap and a SED rate. For example, if an interval between sampling signals (namely, ADC samples) is greater than Δt, a SED gap may have a minimum value of Δt, and a SED rate may have a maximum value of 1/Δt.

Additionally, the method of detecting an envelope may satisfy only a condition of equal intervals between '2N+1' sampling signals that are used to obtain an envelope component value, without a need to fix a SED gap and a SED rate. In this example, N is a natural number equal to or greater than '1.'

Accordingly, it is possible to increase or reduce the SED rate as desired, and to increase an accuracy of an envelope detected by applying different SED gaps to a single envelope component value.

For example, in wireless power transmission the envelope may correspond to the point in time at which the greatest amount of power is transmitted by a wireless power source or a point in time at which the greatest amount of power is received by a target device. Accordingly, accurate detection of the envelope may lead to an increase in the efficiency of the wireless power transmission used to charge the target device.

The above-described envelope detection apparatus may be used to exchange control information or other information between a transmitter and a receiver in a system in which wireless power transmission is performed, for example, a terminal, a mobile phone, a wireless television (TV), and the like. As another example, the envelope detection apparatus may be applied to a bio-healthcare field, and may be used to remotely transmit power to a device inserted into a human body, or used to wirelessly transmit power to a bandage-shaped device for measurement of a heart rate.

According to various aspects, it is possible to detect an envelope of a modulating signal based on only a low calculation complexity and a simple circuit configuration, by detecting an envelope for a plurality of sampling signals with equal time intervals.

According to various aspects, it is possible to accurately detect an envelope based on a predetermined sampling rate for a modulating signal, by adjusting a first time interval between a first sampling signal and a second sampling signal, and adjusting a second time interval between the second sampling signal and a third sampling signal, among a plurality of sampling signals.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running As a non-exhaustive illustration only, a terminal/device/transmitter/receiver described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of detecting an envelope, the method comprising:

extracting sampling signals from among a plurality of sampling signals corresponding to a modulating signal;

distinguishing a target sampling signal from among the extracted sampling signals;

calculating envelope component values of the target sampling signal, based on a difference between a component associated with the target sampling signal and components associated with the other sampling signals from among the extracted sampling signals, the calculating comprising performing squaring on the target sampling signal and multiplication between the other extracted sampling signals, to individually calculate the component associated with the target sampling signal and the components associated with the other extracted sampling signals:

performing addition on values obtained by the multiplication; and performing subtraction of a value obtained by the addition from a value obtained by the squaring; and detecting an envelope of the modulating signal based on the calculated envelope component values.

2. The method of claim 1, further comprising:

calculating an average value of the envelope component values corresponding to the target sampling signal.

3. The method of claim 1, wherein '2N+1' sampling signals are extracted from among the plurality of sampling signals, where N is a natural number that is equal to or greater than '1.'

4. The method of claim 1, wherein the extracted sampling signals comprise a first sampling signal, a second sampling signal, and a third sampling signal, and a first time interval between the first sampling signal and the second sampling signal is equal to a second time interval between the second sampling signal and the third sampling signal.

5. The method of claim 1, further comprising:

adjusting a first time interval between a first sampling signal and a second sampling signal, and adjusting a second time interval between the second sampling signal and a third sampling signal.

6. The method of claim 1, further the comprising:

generating the plurality of sampling signals corresponding to the modulating signal.

7. The method of claim 1, wherein the extracted sampling signals are sampled at equal time intervals.

8. The method of claim 1, wherein the modulating signal is obtained through an analog-to-digital conversion (ADC).

9. The method of claim 1, wherein the calculating is repeatedly performed a plurality of times until an overall envelope of the modulating signal is obtained.

10. The method of claim 1, wherein the extracting comprises extracting at least three sampling signals from among the plurality of sampling signals corresponding to the modulating signal.

11. A non-transitory computer readable recording medium storing a program to cause a computer to implement the method of claim 1.

12. An apparatus for detecting an envelope, the apparatus comprising:

an extracting unit configured to extract sampling signals from among a plurality of sampling signals corresponding to a modulating signal;

a distinguishing unit configured to distinguish a target sampling signal from among the extracted sampling signals;

a calculating unit configured to calculate envelope component values corresponding to the target sampling signal, based on a difference between a component associated with the target sampling signal and components associated with the other sampling signals from among the extracted sampling signals, the calculating unit comprising a squarer configured to perform squaring on the target sampling signal, to calculate the component associated with the target sampling signal, a multiplier configured to perform multiplication between the other extracted sampling signals, to calculate the components associated with the other extracted sampling signals, and an adder configured to perform addition on values obtained by the multiplication, and the calculating unit being configured to perform subtraction of a value obtained by the addition from a value obtained by the squaring; and a detecting unit configured to detect an envelope of the modulating signal based on the calculated envelope component values.

13. The apparatus of claim 12, further comprising:

an average operator configured to calculate an average value of the envelope component values corresponding to the target sampling signal.

14. The apparatus of claim 12, wherein '2N+1' sampling signals are extracted from the plurality of sampling signals, where N is a natural number that is equal to or greater than '1.'

15. The apparatus of claim 12, wherein the extracted sampling signals comprise a first sampling signal, a second sampling signal, and a third sampling signal, and a first time interval between the first sampling signal and the second sampling signal is equal to a second time interval between the second sampling signal and the third sampling signal.

16. The apparatus of claim 12, further comprising:

an adjusting unit configured to adjust a first time interval between a first sampling signal and a second sampling signal, and to adjust a second time interval between the second sampling signal and a third sampling signal.

17. The apparatus of claim 12, further comprising a generating unit configured to generate the plurality of sampling signals corresponding to the modulating signal.

18. The apparatus of claim 12, wherein the extracted sampling signals are sampled at equal time intervals.

* * * * *